(12) United States Patent
Ozawa et al.

(10) Patent No.: US 8,721,063 B2
(45) Date of Patent: *May 13, 2014

(54) INKJET RECORDING LIQUID AND INKJET RECORDING DEVICE USING THE LIQUID

(75) Inventors: Noriaki Ozawa, Osaka (JP); Noriaki Furukawa, Osaka (JP); Susumu Hiroshima, Osaka (JP)

(73) Assignee: Kyocera Mita Corporation (JP)

( * ) Notice: Subject to any disclaimer, the term of this patent is extended or adjusted under 35 U.S.C. 154(b) by 390 days.

This patent is subject to a terminal disclaimer.

(21) Appl. No.: 13/193,727

(22) Filed: Jul. 29, 2011

(65) Prior Publication Data

US 2012/0038704 A1 Feb. 16, 2012

(30) Foreign Application Priority Data

Aug. 11, 2010 (JP) .................................. 2010-179890
Jun. 23, 2011 (JP) .................................. 2011-139057

(51) Int. Cl.
*B41J 2/01* (2006.01)

(52) U.S. Cl.
USPC .............................. 347/100; 347/95; 523/160

(58) Field of Classification Search
USPC ......... 347/100, 95, 96, 101, 102, 103, 22, 20; 106/31.6, 31.13, 13.27; 523/160, 161
See application file for complete search history.

(56) References Cited

U.S. PATENT DOCUMENTS

| 6,056,814 | A | * | 5/2000 | Kato et al. .................... 106/412 |
| 6,074,467 | A | | 6/2000 | Tabayashi et al. |
| 7,629,395 | B2 | * | 12/2009 | Nishiguchi et al. .......... 523/160 |
| 2007/0112095 | A1 | | 5/2007 | Moribe et al. |
| 2008/0028980 | A1 | * | 2/2008 | Aoki et al. .................... 347/100 |
| 2008/0139706 | A1 | * | 6/2008 | Kaji et al. ...................... 524/88 |
| 2009/0326127 | A1 | | 12/2009 | Idemura et al. |
| 2013/0113864 | A1 | | 5/2013 | Moribe et al. |

FOREIGN PATENT DOCUMENTS

| JP | 11-302586 | 11/1999 |
| JP | 2009-84501 | 4/2009 |

* cited by examiner

*Primary Examiner* — Manish S Shah
(74) *Attorney, Agent, or Firm* — Gerald E. Hespos; Michael J. Porco; Matthew T. Hespos (57) ABSTRACT

The inkjet recording liquid according to the present disclosure contains water, pigment and pigment dispersion resin. The pigment dispersion resin is alkali soluble, and is dissolved in recording liquid. The mass ratio of pigment dispersion resin to pigment (resin content/pigment content) is 0.1 to 0.3. The mass ratio of pigment dispersion resin not adhering to pigment to pigment (unattached resin/pigment content) is 0.01 to 0.1. The acid value of the pigment dispersion resin is 150 to 250 mg KOH/g. The molecular weight of the pigment dispersion resin is preferably 10,000 or more.

5 Claims, 3 Drawing Sheets

INKJET RECORDING LIQUID AND INKJET RECORDING DEVICE USING THE LIQUID

BACKGROUND OF THE INVENTION

1. Field of the Invention

The disclosure of the present invention relates to an inkjet recording liquid and an inkjet recording device using the liquid, and relates especially to satisfactory intermittent discharge properties and bronzing suppression.

2. Description of the Related Art

In general, inkjet recording devices form an image on a recording medium by discharging a recording liquid from a recording head onto the recording medium as the recording medium is being transported. Due to rapid advances in inkjet recording technology in recent years, it is now possible to obtain high-definition images equivalent to silver halide photographs when using photographic paper as the recording medium.

However, because in recording with such inkjet recording devices the recording head forms an image without making contact with the recording medium, the image may be corrupted by satellite behavior, in which droplets of the recording liquid are displaced in the transport direction of the recording paper. One cause of the satellite behavior is increased viscosity of the recording liquid as it dries in the nozzle of the inkjet recording device.

In the case of intermittent printing, when there are long intervals between printing the discharge properties of the recording liquid (hereunder called intermittent discharge properties) show a tendency towards increased viscosity of the recording liquid in the nozzle because the recording liquid is more likely to dry in the nozzle the longer the discharge interval. In low-temperature environments in particular, the change in viscosity is greater relative to the drying rate, so that the viscosity of the recording liquid increases rapidly even if there is a slight rise in the drying rate, and satellite behavior is much more likely to occur.

Satellite behavior can be suppressed by increasing the surface tension of the discharged recording liquid to make the droplets more cohesive. The surface tension of the recording liquid can be increased by ensuring that there is no unattached pigment dispersion resin in the recording liquid, but when there is no unattached pigment dispersion resin, bronzing is more likely to occur.

For example, it has been reported that in an ink composition for inkjet recording containing a pigment dispersion including a dispersed water-soluble styrene-(meth)acrylate resin, good recorded images and stable discharge from the inkjet recording head can be obtained by setting the content of the water-soluble resin and the content of the unattached water-soluble resin within specific ranges. However, although this ink composition is superior in terms of stable discharge, there has been no research into strategies for dealing with the problems of bronzing and deterioration of the discharge properties during intermittent printing with long intervals between ink discharge, especially in low-temperature, low-humidity environments.

It has also been reported that with an aqueous ink having a pigment contained in non-water-soluble polymer particles, images with superior image clarity and printing concentration can be obtained by keeping the average particle diameter of the polymer particles, the content of unattached polymer and the pigment content within specific ranges. However, since this aqueous ink uses water-insoluble polymer particles with a small average particle diameter, the viscosity of the ink is likely to change due to re-aggregation of the polymer particles in low-temperature, low-humidity environments, so there is room for improvement in the intermittent discharge properties of the ink.

SUMMARY OF THE INVENTION

The problem to be solved by these disclosures, which were developed in light of this prior art, is to provide an inkjet recording liquid whereby the intermittent discharge properties of the ink in low-temperature, low-humidity environments are improved and bronzing is suppressed, as well as an inkjet recording device using the liquid.

That is, one aspect of the present disclosure is an inkjet recording liquid containing water, a pigment and a pigment dispersion resin, wherein the pigment dispersion resin is an alkali-soluble resin, the mass ratio of the pigment dispersion resin to the pigment (resin content/pigment content) is 0.1 to 0.3, the mass ratio of unattached resin derived from the pigment dispersion resin to pigment (unattached resin content/pigment content) is 0.01 to 0.1, and the acid value of the pigment dispersion resin is 150 to 250 mgKOH/g.

Another aspect of the present disclosure is an inkjet recording device having a recording head for discharging a recording liquid on a recording medium, whereby the aforementioned inkjet recording liquid is discharged from the recording head.

DETAILED DESCRIPTION OF THE PREFERRED EMBODIMENTS

Recent years have seen rapid advances in inkjet recording technology, and in terms of picture quality, it is now possible to obtain a high-definition picture comparable to a silver halide photograph using photographic paper for example. However, in inkjet recording systems the picture is formed on the recording medium by propelling the recording liquid from a recording head positioned so as not to contact the recording medium, and satellite phenomenon can occur in which the recording liquid is displaced in the transport direction of the recording medium. This satellite phenomenon may occur for various reasons, but may often occur due to increased viscosity of the recording liquid, which is caused because the recording liquid is dried while waiting to be discharged from the nozzle of the inkjet recording device. When the recording liquid waiting to be discharged dries even more in low-temperature, low humidity environments, its viscosity may becomes even higher. Because satellite phenomenon is more pronounced when the processing speed of the inkjet recording device is higher, it is a serious problem in inkjet recording devices equipped with long inkjet recording heads, which are advantageous for high-speed, high-quality imaging.

One factor inhibiting satellite phenomenon is that the relative change in the viscosity of the droplets is small when recording liquid is left in a dry environment. The relative change in viscosity depends on the viscosity change rate of the droplets of discharged recording liquid. The closer the viscosity change rate is to 100%, the smaller the relative change in the viscosity of the recording liquid.

The viscosity change rate of the recording liquid is calculated as a percentage (%) by dividing the viscosity of the recording liquid after drying by the initial viscosity of the recording liquid. The viscosity of the recording liquid can be measured for example using a vibrating viscometer (A&D "SV-10" or the like).

Another factor inhibiting satellite phenomenon is the fact that components of the dried recording liquid, namely solid pigment components, re-dissolve in the recording liquid. Dissolution of the dried recording liquid depends on the re-solubility of the droplets of recording liquid. This means that the closer the re-solubility is to 100%, the easier it is for the solid pigment components to re-dissolve in the recording liquid.

The re-solubility of the recording liquid is represented as a percentage (%) value obtained by leaving the recording liquid in a dry environment until it becomes a paste, adding new recording liquid, then adding water in the same amount as the vaporized water and dividing the pigment concentration of the supernatant by the pigment concentration of the original recording liquid. The pigment concentration can be measured, for example, using an ultraviolet absorption meter (Shimadzu "UVM-402" or the like).

In inkjet recording systems, when a recorded image is formed with a high optical density, a phenomenon called bronzing may occur in which crystals of pigment are precipitated on the recording medium during the drying process, and the recorded image reflects light with a metallic luster. Since bronzing involves light reflection and scattering, not only is the optical density of the recorded image reduced rather than enhanced, but transparency is lost and the hue of the recorded image is much different from the desired hue, so bronzing suppression is an important factor affecting the performance of inkjet inks. Bronzing tends to occur when the recording liquid contains little or no unattached resin, which is pigment dispersion resin not adhering to the pigment.

The inventors completed these disclosures after discovering that the pigment dispersion resin greatly affects the physical properties of the recording liquid in inkjet recording liquids containing water, pigment and pigment dispersion resin. That is, the inkjet recording liquid of these embodiments contains water, pigment and pigment dispersion resin, and the pigment dispersion resin is alkali soluble and is dissolved in the recording liquid. The mass ratio of pigment dispersion resin to pigment (resin content/pigment content) is 0.1 to 0.3. The mass ratio of unattached resin (pigment dispersion resin not adhering to pigment) to pigment (unattached resin content/pigment content) is 0.01 to 0.1. The acid value of the pigment dispersion resin is 150 to 250 mg KOH/g.

In view of foregoing, it is possible to obtain an inkjet recording liquid with a small viscosity change rate and with good intermittent discharge properties in low-temperature, low-humidity environments, while suppressing bronzing.

Unattached resin means a part of the pigment dispersion resin dissolved in the recording liquid that is not attached to pigment. The unattached resin may be dissolved in the form of acid components of the resin that are ionized to form free ions that dissolve and drift in the recording liquid, or ionized anions that form ion bonds with counter-ions (such as potassium ions and other cations) and dissolve and drift in the recording liquid.

The detail of these disclosures is explained more below.

[Inkjet Recording Liquid]

The inkjet recording liquid (inkjet ink) of these embodiments contains at least water, pigment and a resin for dispersing the pigment (pigment dispersion resin). It may also contain humectants, penetration enhancers, pH adjusters, leveling agents, viscosity adjusters, antifoaming agents, preservatives and various other additives as necessary. The pigment dispersion resin contained in the recording liquid of these disclosures is alkali soluble. The mass ratio of pigment dispersion resin to pigment (resin content/pigment content) is 0.1 to 0.3. The mass ratio of unattached resin (pigment dispersion resin not adhering to pigment) to pigment (unattached resin content/pigment content) is 0.01 to 0.1.

Since the mass ratio of pigment dispersion resin to pigment (resin content/pigment content) is 0.1 to 0.3 and mass ratio of unattached resin to pigment (unattached resin content/pigment content) is 0.01 to 0.1, the mass ratio, of unattached resin to pigment dispersion resin (unattached resin content/resin content) is 0.033 to 1.00.

If the mass ratio of pigment dispersion resin to pigment (resin content/pigment content) is less than 0.1, the pigment may hardly disperse in the recording liquid, and the re-solubility of the recording liquid may be reduced. On the other hand, if the mass ratio of pigment dispersion resin to pigment (resin content/pigment content) is over 0.3, the viscosity change rate of the recording liquid may be high. A high viscosity change rate is a cause of recording liquid discharge failure. When the mass ratio of unattached resin to pigment (unattached resin content/pigment content) is less than 0.01, bronzing may occur on the surface of a recording medium. This lowers image quality. Meanwhile, when this mass rate exceeds 0.1, a viscosity change rate of recording liquid may become large.

When the acid value of the pigment dispersion resin is less than 150 mg KOH/g, the re-solubility of the recording liquid may be reduced, and pigment dispersibility may be poor. If it is over 250 mg KOH/g, on the other hand, the viscosity change rate of the recording liquid may be increased.

In the inkjet recording liquid of these embodiments, the molecular weight of the pigment dispersion resin is preferably 10,000 or more. If the molecular weight of the pigment dispersion resin is 10,000 or more, the pigment dispersion resin is more likely to remain on the surface without penetrating inside the recording medium when the recording liquid is made to adhere to a recording medium. As a result, since the pigment dispersion resin is attached to the pigment, more of the pigment remains on the surface of the recording medium, and the resulting picture has a higher image density. The molecular weight of the pigment dispersion resin is also preferably no more than 200,000. If the molecular weight of the pigment dispersion resin is above 200,000 the high-acid-value resin will be less soluble in water, detracting from pigment dispersibility.

In the inkjet recording liquid of these embodiments, the content of the pigment as a percentage of the total recording liquid is 2 to 8 mass % or preferably 4 to 6 mass %. If the content of the pigment is 2 mass % or more, the image density of the resulting image is more stable. If it is 8 mass % or less, the viscosity change rate of the recording liquid may be lower.

Pigment

Examples of pigments that can be used in these embodiments include coloring pigment components such as insoluble azo pigments, soluble azo pigments, phthalocyanine blue, isoindolinone, quinacridone, dioxazine violet, perinone, betalain and other organic pigments and carbon black, titanium dioxide and other inorganic pigments, as well as body pigments such as white clay, talc, clay, diatomaceous earth, calcium carbonate, barium sulfate, titanium oxide, alumina white, silica, kaolin, aluminum hydroxide and the like.

More specific examples include the yellow (Y) pigments such as C. I. pigment yellow 1 (fast yellow G), 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, and 153 and the like. One of these may be used alone, or two or more may be combined as necessary.

Examples of magenta (M) pigments include C. I. pigment red 1, 2, 3, 5, 17, 22 (brilliant fast scarlet), 23, 31, 38, 48:2 (permanent red 2B (Ba)), 48:2 (permanent red 2B (Ca)), 48:3 (permanent red 2B (Sr)), 48:4 (permanent red 2B (Mn)), 49:1, 52:2, 53:1, 57:1 (brilliant carmine 6B), 60:1, 63:1, 63:2, 64:1, 81 (rhodamine 6G lake), 83, 88, 92, 101 (rouge), 104, 105, 106, 108 (cadmium red), 112, 114, 122 (dimethylquinacridone); 123, 146, 149, 166, 168, 170, 172, 177, 178, 179, 185, 190, 193, 209 and 219 and the like. One of these may be used alone, or two or more may be combined as necessary.

Examples of cyan (C) pigments include C. I. pigment blue 1, 2, 15 (copper phthalocyanine blue R), 15:1, 15:2, 15:3 (phthalocyanine blue G), 15:4, 15:6 (phthalocyanine blue E), 16, 17:1, 56, 60, 63 and the like. One of these may be used alone, or two or more may be combined as necessary.

Examples of black (K) pigments include furnace black, lamp black, acetylene black, channel black and other carbon blacks (C. I. pigment black 7), as well as aniline black (C. I. pigment black 1) and other organic pigments and copper oxide, iron oxide (C. I. pigment black 11), titanium oxide and other metals and the like. One of these may be used alone, or two or more may be combined as necessary.

The average particle diameter of the pigment is preferably to 300 nm, or more preferably 50 to 150 nm, or still more preferably about 100 nm. The average particle diameter of the pigment can be measured using a dynamic light scattering-type particle size distribution analyzer (Horiba "LB-550") or a particle size distribution analyzer (Sysmex "Zetasizer Nano") or the like.

<Pigment Dispersion Resin>

Pigment dispersion resins that can be used in these disclosures include for example styrene-acrylic acid copolymer, styrene-acrylic acid-acrylic acid alkyl ester copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid half ester copolymer, vinyl naphthalene-acrylic acid copolymer, vinyl naphthalane-maleic acid copolymer and other alkali-soluble resins. One of these may be used alone, or two or more may be combined as necessary.

The pigment dispersion resin of these disclosures is alkali soluble, and is dissolved in the inkjet recording liquid. In these embodiments, it is particularly desirable to use a styrene-acrylic acid copolymer.

The content of these pigment dispersion resins in the recording liquid is normally 0.1 to 10 mass %, =preferably 0.5 to 8 mass %, and more preferably 1.0 to 6 mass %.

<Additive>

Of the additives that can be used in the recording liquid of these disclosures, examples of humectants or penetration enhancers include ethylene glycol monobutyl ether, triethylene glycol monomethyl ether, triethylene glycol monobutyl ether, diethylene glycol monomethyl ether, ethylene glycol monomethyl ether, triethylene glycol, hexylene glycol, octane diol, thiodiglycol, 2-butyl-2-ethyl-1,3-propanediol, 3-methyl-1,5-pentanediol, 2-ethyl-2-methyl-1,3-propanediol, 2-butyl-2-ethyl-1,3-butanediol, 2,4-pentanediol, 1,5-pentanediol, 2,2-dimethyl-1,3-propanediol trimethylol propane, 2-methyl-1,3-propanediol, diethylene glycol, propylene glycol, 1,3-butanediol, ethylene glycol, polyethylene glycol, glycerin, 2-pyrrolidone and the like. One of these may be used alone, or two or more may be combined as necessary.

Examples of pH adjusters that can be used in the recording liquid of these disclosures include hydrochloric acid, phosphoric acid, acetic acid, succinic acid, carboxylic acid and other acids and salts thereof, triethanolamine and other bases, and alkali metal hydroxides and the like. One of these may be used alone, or two or more may be combined as necessary.

Examples of leveling agents that can be used in the recording liquid of these disclosures include polyoxyethylene alkyl ethers, polyoxyethylene alkyl allyl ethers, acetylene glycols, polyoxyethylene-polyoxypropylene block copolymers and other non-ionic surfactants and the like. One of these may be used alone, or two or more may be combined as necessary.

Examples of antifoaming agents that can be used in the recording liquid of these disclosures include silicon emulsions, polyether modified silicon emulsions, polyolefin-polyether modified emulsions and the like. One of these may be used alone, or two or more may be combined as necessary.

The content of these additives in the recording liquid varies according to the type of additives and the like, but is in the range of 0.1 to 20 mass % or preferably 1 to 10 mass % of each in the recording liquid.

<Inkjet Recording Liquid Manufacturing Method>

The inkjet recording liquid of these embodiments can be prepared by sufficiently agitating, mixing and dispersing the raw ingredients described above (water, pigment, pigment dispersion resin, additives and the like) with a wet-type media disperser or propeller agitator or the like for example (or with a ball mill, sand mill, roll mill, agitator, ultrasound homogenizer, wet jet mill, paint shaker or the like), and then centrifuging or filtering the mixture.

In the case of a wet-type media disperser, the disperser preferably has a mechanism for applying the optimal dispersion energy to each type of media, even using zirconia beads with a media size of 0.2 to 1.0 mm for example. For example, an Asada Iron Works "Nanograin Mill", MitSui Mining "MSC-Mill", Shinmaru Enterprises "Dyno-Mill" or the like can be used by preference. After dispersion, the liquid can be centrifuged to remove foreign matter, dust and other coarse particles, and filtered to remove ultrafine particles and finally obtain the inkjet recording liquid of these embodiments.

A highly-concentrated pigment dispersion (liquid with a pigment concentration several times that of the recording liquid) can also be prepared in advance for purposes of preparing the recording liquid.

In the inkjet recording liquid of these embodiments, the pigment is enveloped in a pigment dispersion resin composed of styrene-acrylic acid polymer or the like for example (that is, the pigment dispersion resin is attached to the surface of the pigment). The average particle diameter of the pigment is about 30 to 300 nm, and such pigment particles are dispersed stably in the recording liquid due to static repulsion between the pigment particles. However, not all of the pigment dispersion resin dissolved in the recording liquid is attached to the pigment particles, but some part remains unattached not adhering to the pigment. In the inkjet recording liquid of these disclosures, the amount of unattached pigment dispersion resin not adhering to the pigment is an important parameter, and the methods for measuring this parameter are explained in detail in the examples below.

[Inkjet Recording Device]

The inkjet recording device of the embodiment is not particularly limited as long as it uses the inkjet recording liquid described above.

Figure 1:
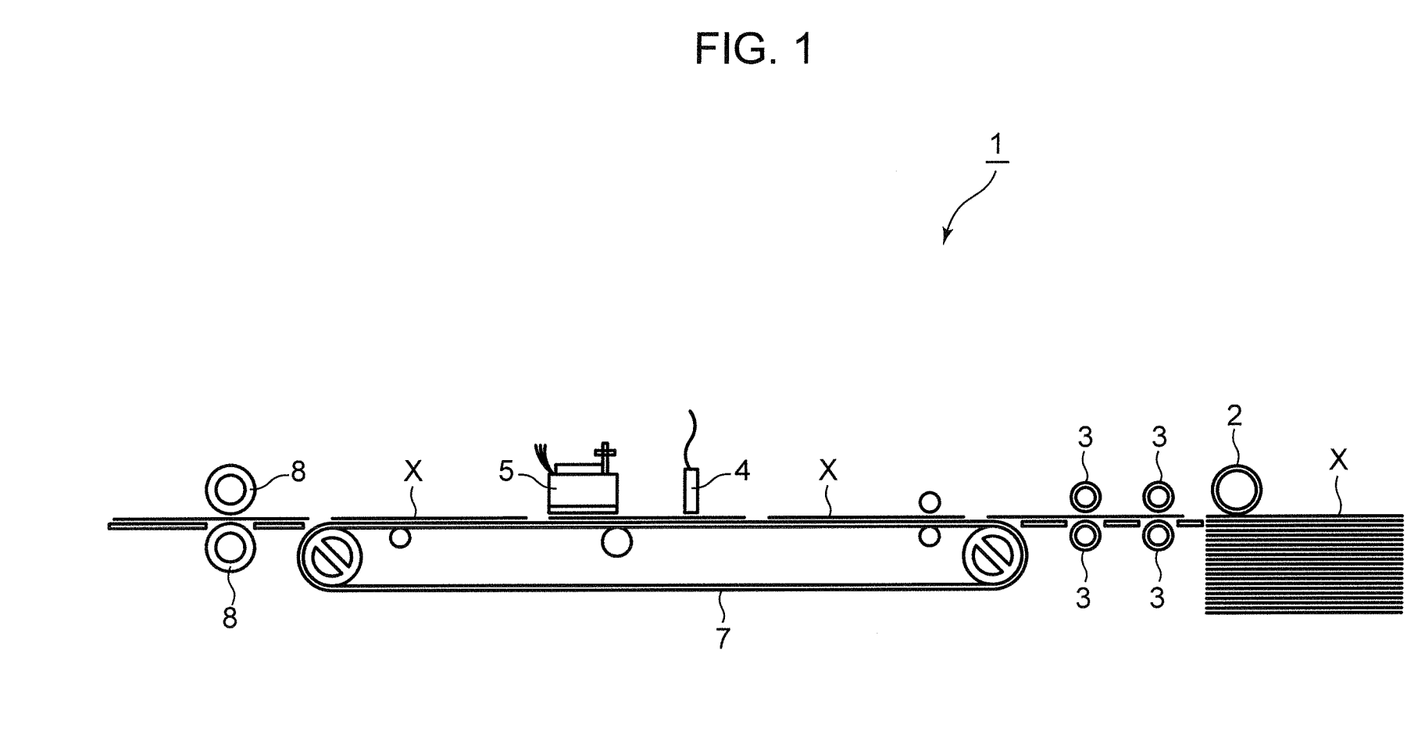
FIG. 1 is a schematic configuration diagram of an inkjet recording device of an embodiment of the disclosures.

One specific embodiment is inkjet recording device 1 shown in FIG. 1, which is an inkjet printer that forms images on recording medium X using inkjet recording liquid based on image data transmitted from another device.

Inkjet recording device 1 is provided with a paper storage part in which PPC paper or another recording medium X is stored in a stack in a paper feed cassette (not shown). Recording medium X is fed 1 sheet at a time from the top of the stack by means of the rotation of a paper feed roller 2, and supplied to a paper transport part by means of a pair of transport rollers 3.

The paper transport part is provided with an endless transport belt 7, which loops horizontally between a pair of rollers. Recording medium X supplied by the transport rollers 3 is transported by the movement of the transport belt 7 to a position facing the image-forming part.

Above the transport belt 7, the image-forming part has a long inkjet recording head 5 with a length equal to or greater than the width of recording medium X transported by the transport belt 7. This recording head 5 is fixed to the housing (not shown) of the inkjet recording device 1, extending in a direction perpendicular to the transport direction of recording medium X. The recording head 5 contains the recording liquid, and as discussed below, has nozzles of an array of multiple dot-forming parts with arranged on its lower surface facing the transport belt 7 and recording medium X, allowing it to form images rapidly on recording medium X by simultaneously discharging recording liquid from nozzles across the entire width of recording medium X. Thus, this inkjet recording device 1 is an inkjet recording device equipped with a long inkjet recording head, which is advantageous for high-speed, high-quality imaging, and can therefore deal adequately with high-speed processing. The recording head 5 is disposed so as not to contact recording medium X, with a distance of about 1 mm between the lower surface (nozzle surface) of the recording head and recording medium X on the transport belt 7, and is fixed to the housing.

A detection sensor 4 for detecting the leading edge of recording medium X that is transported by the transport belt 7 is provided above the transport belt 7 at a position between the upstream side of the recording head 5 in the conveying direction of the recording medium X, and the downstream side of the conveying roller pair 3 in the conveying direction of the recording medium X. A discharge signal for the recording liquid is output to recording head 5 based on the time when this sensor 4 detects the leading edge of recording medium X.

Recording medium X, on which an image is formed by adherence of recording liquid from the recording head 5 as the medium is transported by the transport belt 7, is then transported by the transport belt 7 and passed on to a pair of upper and lower ejection rollers 8 at the terminal end of the transport belt 7, and ejected from the transport belt 7.

Figure 2:
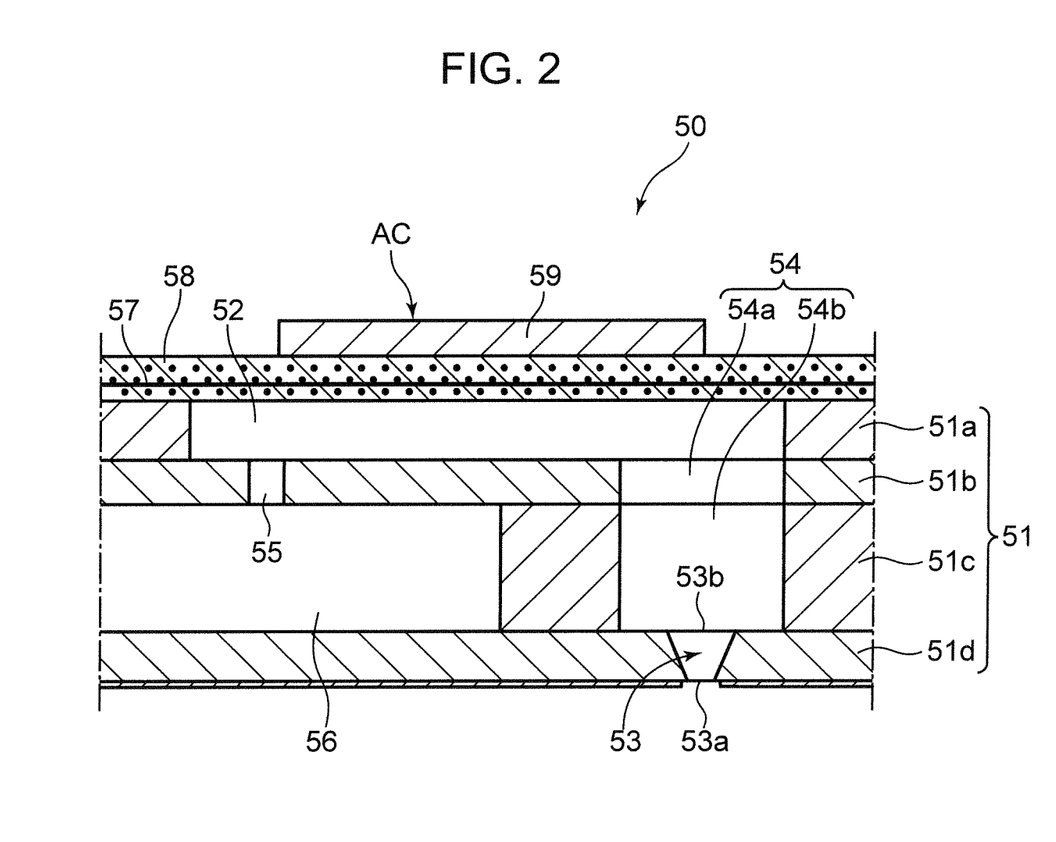
FIG. 2 is an enlarged vertical cross-section of a dot-forming part provided in the recording head of the inkjet recording device.

FIG. 2 is a vertical cross-section showing an enlarged view of one of multiple dot-forming parts 50 arrayed on the recording head 5 of the inkjet recording device 1.

This recording head 5 is a long inkjet recording head extending in a direction perpendicular to the transport direction of recording medium X. Although this is not shown in detail, this recording head 5 has a structure of 3 sub-heads (divided heads) connected sequentially perpendicular to the transport direction of recording medium X. Each sub-head has a structure of 4 nozzle assembly areas, each with a trapezoidal shape in plane view, arranged in sequence perpendicular to the transport direction of the recording medium X (with the tops and bottoms of the trapezoids alternating). In each nozzle assembly area, four rows of the dot-forming parts 50 and the nozzles 53 shown in FIG. 2 are arrayed in the transport direction of recording medium X. With a pitch of 150 dpi between adjacent nozzles 53 in each row, a 600 dpi image can be achieved by offsetting the positions of the nozzles 53 in adjacent rows by ¼ pitch in a direction perpendicular to the transport direction of recording medium X. Since the number of dot-forming parts 50 and nozzles 53 in each row of each nozzle assembly area is 166, 664 dot-forming parts 50 and nozzles 53 are arrayed in one nozzle assembly area (4 rows). Thus, each recording head 5 as a whole is provided with 7968 (664×4×3) dot-forming parts 50 and nozzles 53.

Each dot-forming part 50 is provided with a pressurizing chamber 52 having an oval shape in plane view, and one end of the pressurizing chamber 52 communicates via a nozzle flow passage 54 with the nozzle 53 formed on the lower surface of the recording head 5, while the other end communicates via a chocked channel 55 with common recording liquid supply channel 56. The nozzle 53 has an inverted truncated cone shape, with upper opening 53b having a larger diameter than lower opening 53a.

A dot-forming part 50 is composed of 1st substrate 51a with pressurizing chamber 52 formed therein, 2nd substrate 51b with chocked channel 55 and top part 54a of nozzle flow passage 54 formed therein, 3rd substrate 51c with common recording liquid supply channel 56 and bottom part 54b of nozzle flow passage 54 formed therein, and 4th substrate 51d with nozzle 53 formed therein. A base 51 of the recording head 5 is provided by the stacked 1st through 4th substrates 51a to 51d.

Piezoelectric actuator AC having an individual electrode corresponding to the pressurizing chamber 52 of each dot-forming part 50 layered on piezoelectric element 58 having common electrode 57 on the inside is provided on the upper surface of the base 51. Driving the piezoelectric actuator AC causes pressure waves to be transmitted to the recording liquid inside the pressurizing chamber 52, and the recording liquid inside the nozzle flow passage 54 and the nozzle 53 is vibrated by the pressure waves, and is discharged from the lower opening 53a of the nozzle 53 towards recording medium X.

Regarding the specifications of the dot-forming part 50, examples of specific desirable values are as follows.
Area of pressurizing chamber 52: 0.2 mm²
Width of pressurizing chamber 52: 200 μm
Depth of pressurizing chamber 52: 100 μm
Length of nozzle 53: 30 μm
Radius of lower opening 53a of nozzle 53: 10 μm
Diameter of nozzle flow passage 54: 200 μm
Length of nozzle flow passage 54: 800 μm
Diameter of chocked channel 55: 30 μm
Length of chocked channel 55: 40 μm The inkjet recording device 1 shown as an example in FIG. 1 has one recording head 5 and forms images with a single color, but the disclosure is not limited thereto and multiple (4) recording heads 5, one having Y (yellow) ink, one M (magenta) ink, one C (cyan) ink and one K (black) ink, could also be arrayed in the direction of transport of recording medium X to provide full-color images.

As long as the desired high-speed processing is achieved, moreover, inkjet recording device 1 can also be provided with a serial recording head that scans recording medium X, rather than a long inkjet recording head.

[Inkjet Recording Method]

Using an inkjet recording device 1 of the configuration described above, the inkjet recording method of these embodiments can be achieved by storing the inkjet recording liquid of these embodiments in the recording head 5 as described above, and discharging the recording liquid from the recording head 5 as recording medium X is transported by the transport belt 7, so that the recording liquid adheres to recording medium X and forms an image.

Example

These disclosures are explained in detail below through detailed descriptions of examples, but these disclosures are not limited to the following examples.

The evaluation methods used in the examples are explained first.

[Evaluation of Recording Liquid]

(Re-Solubility)

10 g of the prepared recording liquid was placed in a glass container with a diameter of 47 mm, and left for 2 weeks in a thermostatic chamber of 50% RH, 60° C. The Water and Solvent components of the recording liquid vaporized, leaving a paste. The container was removed from the thermostatic chamber, and returned to room temperature. A new 5 g of the same recording liquid was added to the container, and left for 1 hour. Water in the amount of the vaporized water was added, and the supernatant was collected. The supernatant was diluted 3000 times with water, and ultraviolet absorption of the supernatant was measured with an ultraviolet absorption meter (Shimadzu "UVM-402"). The pigment concentration of the supernatant was determined from the UV absorption, and the re-solubility of the recording liquid was evaluated as percentage (%) by dividing this value by the pigment concentration of the original recording liquid. The closer the value is to 100%, the better the re-solubility. Re-solubility of 100% was considered acceptable in the context of the re-solubility evaluation.

(Viscosity Change Rate)

200 g of the prepared recording liquid was placed in a glass container with a diameter of 47 mm, left in a thermostatic chamber set to 23° C./50% RH, and sampled at periodic intervals, and viscosity was measured with a vibrating viscometer (A&D "SV-10"). The value of the measured viscosity divided by the initial viscosity was given as the viscosity change rate (%). The closer the value is to 100%, the lower the viscosity change rate.

(Intermittent Discharge Properties)

Using the inkjet recording device 1 shown in FIG. 1 (printing speed 100 sheets/minute using A4 size paper of landscape feeding), a horizontal line image was printed from recording head 5, followed by preliminary vibration. Next, 5 horizontal lines (1 horizontal line×5) were printed on glossy paper with random spaces between printing. The effective printed line in intermittent printing was evaluated based on the degree of corruption of the initial line.

When intermittent discharges corresponding to all vertical lines on A3 size paper were effective, the intermittent discharge property was 100%. Otherwise, the interval (number of lines) corresponding to the ineffective lines was divided by the number of A3 lines, and the percentage was given as the success rate.

This evaluation was performed under environmental conditions of 10° C./15% RH, under which discharge failure of the recording liquid is likely to occur, and the discharged amount of the recording liquid was controlled at 5.5 pL. In evaluating the intermittent discharge properties, 100% intermittent discharge was considered acceptable.

(Bronzing)

Using the inkjet recording device 1 shown in FIG. 1, a solid image was printed on normal paper (A4 PPC) using recording head 5, and the occurrence of bronzing was evaluated with the naked eye. O means that no bronzing was seen with the naked eye, and x means that bronzing occurred. The amount of recording liquid discharged by the recording head 5 was controlled at 11 pL per each nozzle, and the printed matter was evaluated under identical conditions.

[Preparation of Recording Liquid]

Next, the method for preparing the inkjet recording liquid is explained.

First, a pigment dispersion for use in preparing the recording liquid was prepared with the following composition.

| | |
|---|---|
| Ion-exchange water | 77.75 to 83.0 mass % |
| Leveling agent (2,4,7,9-tetramethyl-5-decyne-4,7-dioldi(polyoxyethylene) ether) (Surfynol ™ 465, manufactured by Nisshin Chemical Industries) | 0.5 mass % |
| Pigment (phthalocyanine blue) | 15 mass % |
| Pigment dispersion resin (neutralized with NaOH aqueous solution) | 1.50 to 6.75 mass % |

The mass of Na derived from the NaOH aqueous solution, which was used for neutralization of the pigment dispersion resin, is included in the mass of the pigment dispersion resin, and the water mass of NaOH aqueous solution and the mass of water produced in neutralization reaction is included in the mass of ion-exchange water. Specifically, the aforementioned materials for preparing pigment dispersion and the NaOH aqueous solution were loaded into a Nanograin Mill (Asada Iron Works), zirconia beads with a media size of 0.5 mm were packed as media in the Nanograin Mill, and the pigment and pigment dispersion resin were kneaded with water cooling until the volume-average particle diameter of the pigment in the resulting pigment dispersion was in the range of 70 to 130 nm, to obtain a pigment dispersion.

The pigment dispersion resin was prepared as follows. A macromonomer (Toagosei "AS-6"; oligomer having (meth) acryloyl group bound to one molecular end of polystyrene; number-average molecular weight 6000), methacrylic acid, styrene monomer and methyl methacrylate were polymerized by reacting them in various compounded proportions in methylethyl ketone (MEK) using 2,2'-azobisisobutyronitrile as the initiator, and after completion of the reaction the solvent was distilled off under reduced pressure. The weight-average molecular weight (Mw) of the resulting resin was measured by GPC (gel permeation chromatography).

The acid value of the resulting resin was measured with an automated potentiometric titration device.

Various kinds of pigment dispersion resin (resins A to E) having different weight-average molecular weights (Mw) and various acid values (mg KOG/g) were obtained in this way.

The acid values and weight-average molecular weights of resins A to E are shown in Table 1 below.

TABLE 1

| | RESIN A | RESIN B | RESIN C | RESIN D | RESIN E |
|---|---|---|---|---|---|
| ACID VALUE (mgKOH/g) | 130 | 160 | 200 | 240 | 300 |
| WEIGHT-AVERAGE MOLECULAR WEIGHT (Mw) | 20,000 | 35,000 | 33,000 | 37,000 | 40,000 |

Using an Asada Iron Works wet media disperser "Nanograin Mill", these raw materials were set in a vessel, and sufficiently agitated and dispersed so that the average particle diameter of the pigment after dispersal was about 100 nm. After dispersal the liquid was centrifuged to remove coarse particles and obtain a pigment dispersion. The average particle diameter of the resulting pigment was measured with a particle size distribution analyzer (Sysmex "Zetasizer Nano") after the pigment dispersion had been diluted 300 times with ion-exchange water.

Recording liquid was then prepared with the following composition. The viscosity of the recording liquid was adjusted to 6 mPa·s.

| | |
|---|---|
| Pigment dispersion | 26.26 mass % |
| Leveling agent (2,4,7,9-tetramethyl-5-decyne-4-7-dioldi(polyoxyethylene) ether) (Surfynol ™ 465, manufactured by Nisshin Chemical Industries) | 0.5 mass % |
| 1,3-butanediol | 5.0 mass % |
| Triethylene glycol monobutyl ether | 5.0 mass % |
| 2-pyrrolidone | 5.0 mass % |
| Glycerin | 15.0 to 30.0 mass % |
| Ion-exchange water | 27.9 to 42.9 mass % |

The 1,3-butanediol, triethylene glycol monobutyl ether, 2-pyrrolidone and glycerin were humectants or penetration enhancers (organic solvents).

These raw materials were sufficiently agitated, mixed and dispersed at room temperature for 60 minutes at a rotation speed of 500 rpm using a "Polymix Stirrer PX-SR90E", a propeller-type stirrer manufactured by Central Scientific Commerce. After dispersion treatment, the liquid was pressure filtered with a 5 μm pore filter to remove ultrafine particles and obtain an inkjet recording liquid.

A variety of recording liquids (Recording Liquid 1 to Recording Liquid 26) having various weight-average molecular weights (Mw) of the pigment dispersion resin, various acid values of the pigment dispersion resin, various mass ratios of pigment dispersion resin to pigment in the recording liquid (resin content/pigment content) and various mass ratios of unattached resin to pigment in the recording liquid (unattached resin content/pigment content) were obtained in this way.

[Investigation of Acid Value]

The re-solubility and viscosity change rate over time of recording liquids 1 to 5 prepared as described above using resins A to E in Table 1 were evaluated. The mass ratio of pigment dispersion resin to pigment (resin content/pigment content) was 0.20.

The re-solubility is shown in Table 2. The viscosity change rate evaluation was conducted in use of a graph showing the relationship between the length of time required for recording liquid to dry and a viscosity change rate as shown in FIG. 3.

As shown in Table 2, recording liquid 1, in which the acid value of the pigment dispersion resin is 130 mg KOH/g, shows inferior results, with a re-solubility of 30%. This is attributed to the low acid value of the resin, which means that the solid component of the dried ink (pigment) cannot be re-dispersed in the recording liquid because it has few hydrophilic components.

Figure 3:
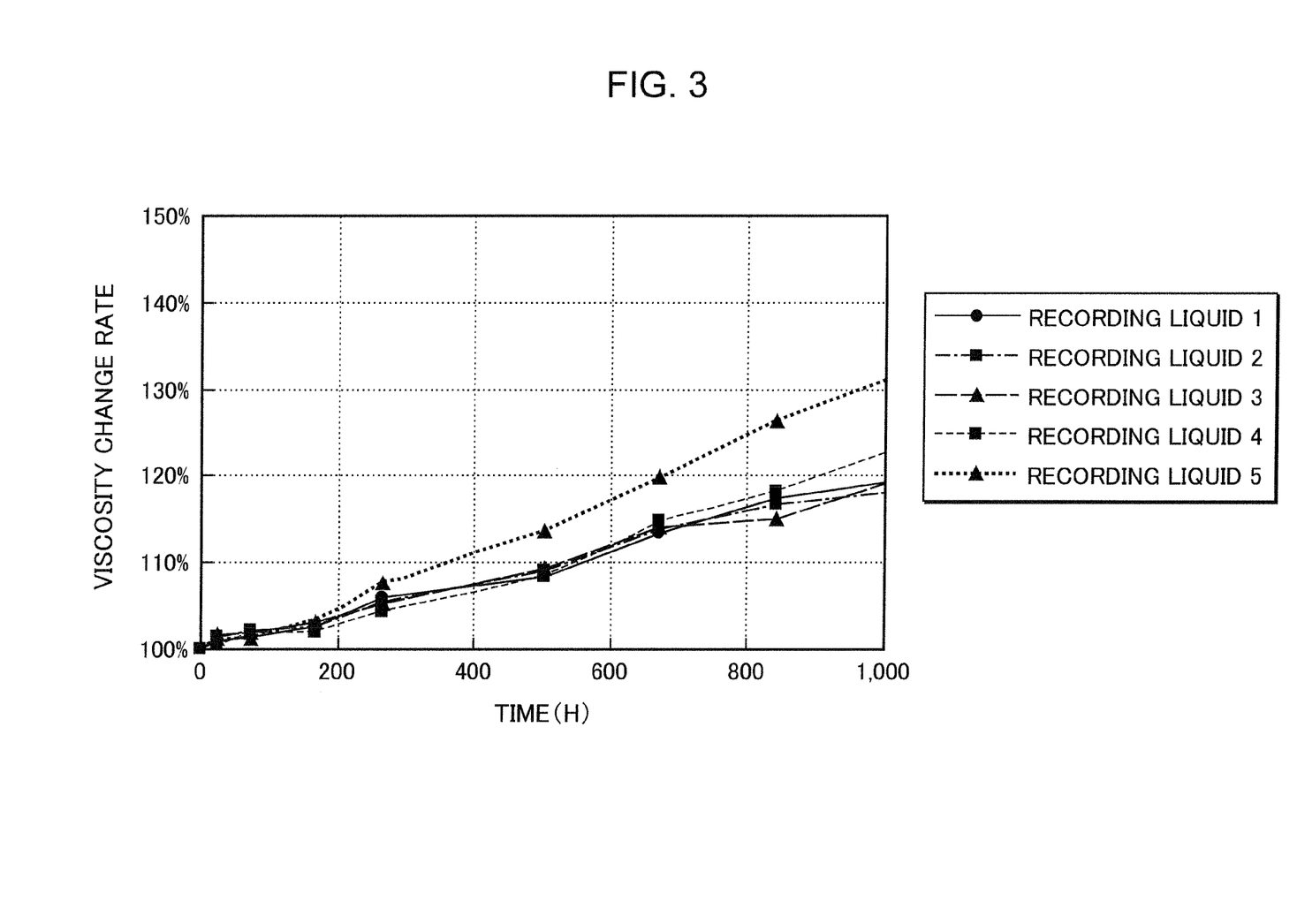
FIG. 3 is a graph showing the relationship between time and the viscosity change rate of an inkjet recording liquid.

As shown in FIG. 3, recording liquid 5, in which the acid value of the pigment dispersion resin is 300, has a viscosity change rate of more than 110% when left to dry for 500 hours (about 20 days), and a viscosity change rate of more than 130% when left to dry for 1000 hours (about 40 days). This means that even if re-solubility is good (such as 100%) at the beginning of use, storage stability is poor, and if recording liquid 5 is left to dry for 20 days or more, the viscosity increases dramatically leading to discharge failure of the recording liquid.

The results of Tables 1 and 2 above and FIG. 3 show that an inkjet recording liquid with excellent re-solubility and a low viscosity change rate can be obtained using a pigment dispersion resin with an acid value of 150 to 250 mg KOH/g.

[Adjustment of Unattached Resin Content]

In the inkjet recording liquid of these disclosures, some of the pigment dispersion resin is unattached resin that does not adhere to the pigment.

The unattached resin content is calculated by the following measurement methods.

(Measurement of Unattached Resin in Recording Liquid)

10 g of the prepared recording liquid was placed in a cell, and processed for 24 hours at 5000 rpm in a centrifuge (Nano Seeds "NS-C100"). The transparency of the supernatant solution of the recording liquid in the cell was, confirmed with naked eye, and all of the supernatant solution was collected. The collected supernatant solution was weighed, the solvent component was completely vaporized in a vacuum oven at 150° C., leaving only the solid components, and the solids (resin) were weighed. The measured weight (W) in grams was given as the amount of unattached resin (bound by ion bonds with potassium ions) per 10 g of recording liquid. The amount (mass %) of unattached resin A in the recording liquid was then calculated by the following formula:

$$A(\text{mass \%}) = \{(W/10) \times 100\}.$$

The desired content of unattached resin can be achieved as shown in Table 3 below by adjusting the number of dispersion steps and the size of the zirconia beads used in the wet media disperser.

TABLE 3

| | RECORDING LIQUID 6 | RECORDING LIQUID 7 | RECORDING LIQUID 8 |
|---|---|---|---|
| 1ST DISPERSION STEP | 1.0 mm DI. ZIRCONIA BEADS | 0.5 mm DI. ZIRCONIA BEADS | 1.0 mm DI. ZIRCONIA BEADS |

TABLE 2

| (Resin content/Pigment content) = 0.20 | | | | | |
|---|---|---|---|---|---|
| | RECORDING LIQUID 1 | RECORDING LIQUID 2 | RECORDING LIQUID 3 | RECORDING LIQUID 4 | RECORDING LIQUID 5 |
| TYPE OF RESIN | RESIN A | RESIN B | RESIN C | RESIN D | RESIN E |
| RE-SOLUBILITY (%) | 30 | 100 | 100 | 100 | 100 |

TABLE 3-continued

|  | RECORDING LIQUID 6 | RECORDING LIQUID 7 | RECORDING LIQUID 8 |
|---|---|---|---|
| 2ND DISPERSION STEP | — | — | 0.5 mm DI. ZIRCONIA BEADS |
| RESIN/PIGMENT | 0.2 | 0.2 | 0.2 |
| UNATTACHED RESIN | 0.6 | 0.4 | 0.2 |

TABLE 3-continued

|  | RECORDING LIQUID 6 | RECORDING LIQUID 7 | RECORDING LIQUID 8 |
|---|---|---|---|
| UNATTACHED RESIN/PIGMENT | 0.15 | 0.10 | 0.05 |

A Dyno-Mill (Shinmaru Enterprises: laboratory bead mill) was used as the disperser with a vessel capacity of 1.4 L and a disk diameter of 80 mm. A total of 500 g of dispersion was loaded in the mill.

As shown in Table 3, the unattached resin content was 0.6 mass % in the case of recording liquid 6, which was dispersed 1 pass at a discharge rate of 300 g/min using zirconia beads 1.0 mm in diameter, but 0.4 mass % in the case of recording liquid 7, which was dispersed 1 pass at a discharge rate of 300 g/min using zirconia beads 0.5 mm in diameter. This is believed to be because making the beads smaller promotes formation of finer particles in the pigment dispersion, increasing the degree of attachment of the pigment dispersion resin to the pigment, and thereby reducing the amount of unattached resin in the recording liquid.

The unattached resin content was 0.2 mass % in the case of recording liquid 8, which was, in a first dispersion step, dispersed in 1 pass at a discharge rate of 300 g/min using zirconia beads 1.0 mm in diameter, followed by a second dispersion step of 1 pass at 300 g/min using zirconia beads 0.5 mm in diameter. It is thought that the amount of unattached resin in the recording liquid was reduced because re-aggregation of the pigment dispersion was prevented by dividing the dispersion process into two steps, and using large zirconia beads in the first dispersion step and small zirconia beads in the second dispersion step.

This investigation shows that the unattached resin content of the inkjet recording liquid of these disclosures can be increased or decreased by adjusting the size of the zirconia beads and the number of dispersion steps during the process of preparing the pigment dispersion.

[Investigation of Resin Content]

Using resins A to E in Table 1, with the mass ratio of pigment dispersion resin to pigment (resin content/pigment content) set at 0.15 and the mass ratio of unattached resin to pigment (unattached resin content/pigment content) set at 0.05, the intermittent discharge (%), bronzing, re-solubility (%) and viscosity change rate (%) after 500 hours of the resulting recording liquids 9 to 13 were evaluated. The results are shown in Table 4.

TABLE 4

| (Resin content/pigment content) = 0.15 | | | | | |
|---|---|---|---|---|---|
|  | RECORDING LIQUID 9 | RECORDING LIQUID 10 | RECORDING LIQUID 11 | RECORDING LIQUID 12 | RECORDING LIQUID 13 |
| RESIN | RESIN B | RESIN C | RESIN D | RESIN A | RESIN E |
| ACID VALUE (mgKOH/g) | 160 | 200 | 240 | 130 | 300 |
| UNATTACHED RESIN/PIGMENT | 0.05 | 0.05 | 0.05 | 0.05 | 0.05 |
| INTERMITTENT DISCHARGE (%) | 100 | 100 | 100 | 30 | 70 |
| BRONZING | ○ | ○ | ○ | ○ | ○ |
| RE-SOLUBILITY (%) | 100 | 100 | 100 | 30 | 100 |
| VISCOSITY CHANGE RATE (%) | 105 | 104 | 107 | 103 | 114 |

As shown by the results of Table 4, when the mass ratio of pigment dispersion resin to pigment was 0.15, recording liquid 12, in which the acid value of the pigment dispersion resin was 130 mg KOH/g, had a viscosity change rate of around 100% and no bronzing, but other results were poor, with intermittent discharge of 30% and re-solubility of 30%. This is attributed to a smaller hydrophilic component due to the low acid value of the resin, which prevents the solids (pigment, etc.) in the dried ink from re-dispersing in the ink. Recording liquid 13, in which the acid value was 300 mg KOH/g, exhibited re-solubility of 100% and no bronzing, but other results were poor, with intermittent discharge of 70% and a viscosity change rate over 110%. This is attributed to the high acid value of the resin, which makes the resin more viscous than a resin with a low acid value, and adversely affects the intermittent discharge properties by making the ink even more viscous after it is dried.

On the other hand, recording liquids 9 to 11, in which the pigment dispersion resin had an acid value of 150 to 250 mg KOH/g, had good intermittent discharge and re-solubility, low viscosity change rates, and no bronzing.

Next, using resins A to E as in Table 4 with the mass ratio of pigment dispersion resin to pigment (resin content/pigment content) set at 0.25, the mass ratio of unattached resin to pigment (unattached resin/pigment content) was adjusted to specific values, and the intermittent discharge (%), bronzing, re-solubility (%) and viscosity change rate (%) after 500 hours of the resulting, recording liquids 14 to 18 were evaluated. The results are shown in Table 5.

TABLE 5

(Resin content/pigment content) = 0.25

|  | RECORDING LIQUID 14 | RECORDING LIQUID 15 | RECORDING LIQUID 16 | RECORDING LIQUID 17 | RECORDING LIQUID 18 |
|---|---|---|---|---|---|
| RESIN | RESIN B | RESIN C | RESIN D | RESIN A | RESIN E |
| ACID VALUE (mgKOH/g) | 160 | 200 | 240 | 130 | 300 |
| UNATTACHED RESIN/PIGMENT | 0.05 | 0.07 | 0.08 | 0.07 | 0.08 |
| INTERMITTENT DISCHARGE (%) | 100 | 100 | 100 | 30 | 70 |
| BRONZING | ○ | ○ | ○ | ○ | ○ |
| RE-SOLUBILITY (%) | 100 | 100 | 100 | 30 | 100 |
| VISCOSITY CHANGE RATE (%) | 105 | 104 | 106 | 103 | 120 |

As shown by the results of Table 5, when the mass ratio of pigment dispersion resin to pigment was 0.25, recording liquid 17, in which the acid value of the pigment dispersion resin was 130 mg KOH/g, had a viscosity change rate near 100% and no bronzing, but other results were poor, with intermittent discharge of 30% and re-solubility of 30%. Recording liquid 18, in which the acid value was 300 mg KOH/g, also exhibited poor results, with intermittent discharge of 70% and a viscosity change rate of 120%.

However, even when the mass ratio of pigment dispersion resin to pigment was 0.25, it was found that a satisfactory inkjet recording liquid can be obtained in which the intermittent discharge and re-solubility are good, the viscosity change rate is low, and no bronzing occurs in use of the pigment dispersion resins with acid values of 150 to 250 mg KOH/g.

Next, using resins B, C and D with the mass ratio of pigment dispersion resin to pigment (resin content/pigment content) set to 0.45, the mass ratio of unattached resin to pigment (unattached resin/pigment content) was adjusted to specific values, and the intermittent discharge (%), bronzing, re-solubility (%) and viscosity change rate (%) after 500 hours of the resulting recording liquids 19 to 21 were evaluated. The results are shown in Table 6.

TABLE 6

(Resin content/pigment content) = 0.45

|  | RECORDING LIQUID 19 | RECORDING LIQUID 20 | RECORDING LIQUID 21 |
|---|---|---|---|
| RESIN | RESIN B | RESIN C | RESIN D |
| ACID VALUE (mgKOH/g) | 160 | 200 | 240 |
| UNATTACHED RESIN/PIGMENT | 0.09 | 0.08 | 1.00 |
| INTERMITTENT DISCHARGE (%) | 60 | 80 | 80 |
| BRONZING | ○ | ○ | ○ |
| RE-SOLUBILITY (%) | 40 | 100 | 100 |
| VISCOSITY CHANGE RATE (%) | 111 | 112 | 115 |

As shown by the results of Table 6, recording liquids 19 to 21, in which the mass ratio of pigment dispersion resin to pigment was 0.45, had inferior intermittent discharge and viscosity change rates in excess of 110% even though the acid values of the resins were within the range of 150 to 250 mg KOH/g.

It can be seen from Tables 4 to 6 above that a superior inkjet recording liquid with good intermittent discharge and re-solubility, a low viscosity change rate and no bronzing can be obtained if the acid value of the pigment dispersion resin is 150 to 250 mg KOH/g and the mass ratio of pigment dispersion resin to pigment is 0.1 to 0.3.

Next, using resin C, the mass ratio of pigment dispersion resin to pigment (resin content/pigment content) was set to 0.2, the mass ratio of unattached resin to pigment (unattached resin/pigment content) was adjusted to specific values, and the intermittent discharge (%), bronzing, re-solubility (%) and viscosity change rate (%) after 500 hours of the resulting recording liquids 22 to 26 was evaluated. The results are shown in Table 7.

TABLE 7

(Resin content/pigment content) = 0.20

|  | RECORDING LIQUID 22 | RECORDING LIQUID 23 | RECORDING LIQUID 24 | RECORDING LIQUID 25 | RECORDING LIQUID 26 |
|---|---|---|---|---|---|
| RESIN | RESIN C | RESIN C | RESIN C | RESIN C | RESIN C |
| ACID VALUE (mgKOH/g) | 200 | 200 | 200 | 200 | 200 |
| UNATTACHED RESIN/PIGMENT | 0.02 | 0.05 | 0.10 | 0 | 0.14 |
| INTERMITTENT DISCHARGE (%) | 100 | 100 | 100 | 60 | 70 |
| BRONZING | ○ | ○ | ○ | X | ○ |
| RE-SOLUBILITY (%) | 100 | 100 | 100 | 40 | 100 |
| VISCOSITY CHANGE RATE (%) | 102 | 105 | 108 | 100 | 130 |

As shown in Table 7, even when the mass ratio of pigment dispersion resin to pigment was 0.1 to 0.3, recording liquid 25, in which the mass ratio of unattached resin to pigment was 0, had intermittent discharge of 60% and re-solubility of 40% and also exhibited bronzing even though the viscosity change rate was 100%. Recording liquid 26, in which the mass ratio of unattached resin to pigment was 0.14, had intermittent discharge of 70% and an extremely high viscosity change rate. This is attributed to the viscosity enhancing effect of the large volume of unattached resin in the ink.

On the other hand, it was found that a satisfactory recoding liquid can be obtained by recording liquids 22 to 24, which had a mass ratio of pigment dispersion resin to pigment in the range of 0.1 to 0.3 and a mass ratio of unattached resin to pigment in the range of 0.01 to 0.1, were superior in terms of intermittent discharge and re-solubility, had low viscosity change rates, and exhibited no bronzing.

These results show that the presence of a specific percentage of unattached resin is a necessary factor for controlling bronzing. They also show that a superior inkjet recording ink exhibiting good intermittent discharge properties and re-solubility with a low viscosity change rate and no bronzing behavior can be obtained if the acid value of the resin is 150 to 250 mgKOH/g, the mass ratio of pigment dispersion resin to pigment is 0.1 to 0.3, and the mass ratio of unattached resin to pigment is 0.01 to 0.1.

This application is based on Japanese Patent application Nos. 2010-179890 and 2011-139057 filed in Japan Patent Office on Aug. 11, 2010 and Jun. 23, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An inkjet recording liquid containing water, pigment and pigment dispersion resin, wherein
    the pigment dispersion resin is alkali soluble,
    a mass ratio of the pigment dispersion resin to the pigment (resin content/pigment content) is 0.1 to 0.3,
    a mass ratio of unattached resin derived from the pigment dispersion resin to the pigment (unattached resin content/pigment content) is 0.01 to 0.1,
    an acid value of the pigment dispersion resin is 150 to 250 mg KOH/g, and
    the content of the pigment dispersion resin in the recording liquid is 0.5 to 8 mass %.

2. The inkjet recording liquid according to claim 1, wherein a molecular weight of the pigment dispersion resin is 10,000 or more.

3. The inkjet recording liquid according to claim 1, wherein pigment solids constitute 2.0 to 8.0 mass % of the total of the inkjet recording liquid.

4. An inkjet recording device having a recording head for discharging recording liquid onto a recording medium, wherein
    the inkjet recording liquid according to claim 1 is discharged from the recording head.

5. The inkjet recording device according to claim 4, wherein the recording head is a long inkjet recording head.

* * * * *